March 23, 1937.  E. R. GIESEMAN  2,074,329
VENT MECHANISM
Filed Sept. 30, 1935
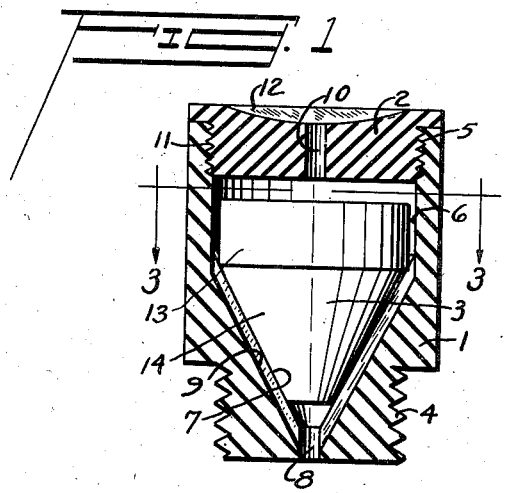
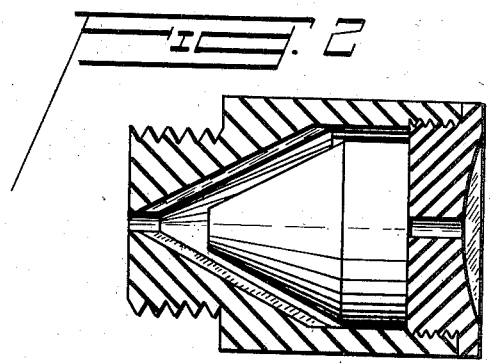
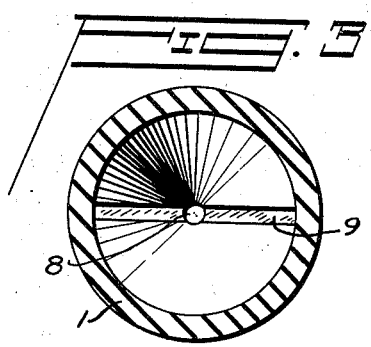
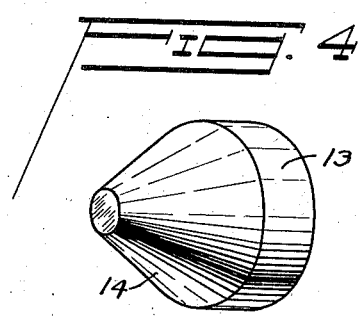
INVENTOR
EARL R. GIESEMAN
BY
ATTORNEYS Patented Mar. 23, 1937

2,074,329

UNITED STATES PATENT OFFICE 2,074,329

VENT MECHANISM

Earl R. Gieseman, Dayton, Ohio

Application September 30, 1935, Serial No. 42,863

3 Claims. (Cl. 136—178)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to vent mechanisms for storage batteries and more particularly to vent plugs which permit the escape of gases from storage batteries but prevent the escape of liquid therefrom.

The primary object of the invention is to provide a means that will operate rapidly and positively to prevent leakage of electrolyte from the battery when the same is laid upon its side, is tilted to a lesser extent, or is completely inverted.

It is a further object of the invention to provide a means which will equally positively vent the aforesaid battery upon return of the same to upright position from the tilted or inverted positions referred to above.

With the foregoing and other objects in view, which will appear as the description proceeds, the invention consists of certain new and novel improvements in vent mechanisms which will be hereinafter more fully illustrated and described in the accompanying drawing and more particularly pointed out in the appended claims.

Referring to the drawing, in which numerals of like character designate similar parts throughout the several claims:

Fig. 1 is an enlarged vertical section of a vent mechanism embodying my invention;

Fig. 2 is a sectional view showing arrest of the sealing element, with tilting the vent mechanism at right angles to Fig. 1;

Fig. 3 is a section taken on the line 3—3 of Fig. 1, with the sealing element removed; and Fig. 4 is an enlarged perspective view of the sealing element.

With the advent of aircraft serious need developed for a vent plug possessing the above stated characteristics. Appreciating this need, I entered upon the design, construction and test of a considerable series of vent plugs. I first employed a conical sealing element (of altitude approximating half base diameter) enclosed within an upside down conical cavity (of like slope but greater altitude) having a small vent hole in the base and in the vertex thereof. With tilting of a battery sidewise, this sealing element readily closed the base vent opening of the cell supporting it, but upon return of the battery to normal, the contacting surfaces of the sealing element remain wedged between the contacted surfaces of the base and wall of the upside down conical cavity, thus preventing gas escapage from the battery cell.

Further sealing elements were constructed with cylindrical portions projecting from the conical bases. The upside down conical housings provided for the above also had cylindrical portions slightly less in length than the cylindrical portions of the sealing elements. The sealing elements still remained wedged, upon return of the battery to normal, thus preventing gas escapage from the battery cells. After numerous alterations in conical slope and many variations of sealing element to cavity cylindrical altitudes, a sealing element was evolved which would function satisfactorily under all conditions of battery tilting.

In Fig. 1, my vent mechanism is seen to comprise a plug body 1 and a body cap 2 of acid resisting material, housing a sealing element or valve 3 of lead or other acid resisting metal. The plug body 1 is provided with external threads 4 for mounting the plug assembly upon a battery cell and internal threads 5 for receiving and holding the body cap 2. A cylindrical cavity 6 extends downwardly from the base of the threads 5 a distance approximately one third of its diameter. From the base of the cylindrical cavity 6 an upside down conical cavity 7 terminates with its projected vertex within a vent hole 8 provided in the bottom of the plug body 1. Two oppositely disposed grooves 9 connect the vent hole 8 with the cylindrical cavity 6 at all times. The last-named are well shown in Fig. 3. The body cap 2 is also provided with a vent hole 10, external threads 11 and a milled slot 12 for screwing the same fast to the plug body 1.

There remains to be considered the sealing element or valve 3, which is comprised of a cylindrical portion 13 and a truncated conical portion 14. A carefully worked out relationship between the size and shape of the last-named portions and the size and shape of the cavity configuration of the plug body 1 and body cap 2 must be maintained if return of the valve 3 to its non-sealed position is to be assured with return of the battery to normal upright position. Further, the location of the center of mass of the valve 3 is a material factor in insuring that the sealing element will slide into a position closing the vent hole 10 without "upset" and therefore with a minimum of resistance. It is readily obvious from an inspection of Fig. 2 that too far forward (i. e., right hand) location of the center of mass will cause clockwise upset of the valve 3, with reference to its supporting cavity, upon sudden contact with the cylindrical surface of said supporting cavity. Similarly, too far aft location will cause counterclockwise upset of the valve 3. In the former case, the lowest point of the valve base will gouge into the bottom portion of the cylindrical cavity 6. In the latter case, the lowest point of the junction of portions 13 and 14 will gouge into the bottom portion of the cylindrical cavity 6.

The portion 14 is constructed such that the altitude of its projected cone substantially equals its base diameter. The portion 13 is constructed such that its altitude approximates one third of its base diameter. Stated in equation form, "$d_1$" (cone diameter) equals "$h_1$" (projected cone height) equals "$d_2$" (cylinder diameter). Also, "$h_2$" (cylinder height) equals one third "$d_1$" or "$h_1$" or "$d_2$". Since the volumes of portions 13 and 14 are substantially equal, since the center of mass of the portion 14 is located approximately "$\frac{1}{4}h_1$" or, in common diameter terms, "$\frac{1}{4}d$" away from its base, and since the center of mass of the portion 13 is located "$\frac{1}{2}h$" or, in common diameter terms; "$\frac{1}{6}d$" away from its common junction with the portion 14, it must follow that the combined center of mass of the portions 13 and 14 lies within portion 14 in very close proximity to the plane of their common junction. It is further important that the cylindrical cavity 6 be of a diameter which will permit free sliding movement of the valve 3 as well as free escapage of electrolyte gases from the vent hole 8 through the vent hole 10. It is still further important that the over-all length of the cylindrical cavity 6 be in excess of the height of the portion 13 to insure that the portion 14 be entirely free of the conical cavity 7 (as shown in Fig. 2) in order that minimum interference be offered to initial sealing of the base of the valve 3 against the inner surface of the body cap 2.

I claim:

1. A vent mechanism comprising, a body having a cylindrical cavity sealed at one end and a conical cavity in continuation of the open end of said cylindrical cavity, the sealed end of said cylindrical cavity and the apex of said conical cavity, each having a vent hole, and a sealing element having a cylindrical portion and a truncated conical portion with surface elements in respective parallelism with the surface elements of said combined cavities, the over-all length of said cylindrical cavity being greater than the over-all length of the cylindrical portion of said sealing element such that the latter is adapted to have sliding motion within said combined cavities.

2. A vent mechanism comprising, a body having a shallow cylindrical cavity sealed at one end and a conical cavity in continuation of the open end of said cylindrical cavity, said conical cavity having a vent hole at its apex and longitudinally disposed grooves communicating therewith, the sealed end of said cylindrical cavity being provided with a centrally disposed vent hole, and a sealing element having a cylindrical portion and a truncated conical portion with surface elements in respective parallelism with the surface elements of said combined cavities, the over-all length of said cylindrical cavity being greater than the over-all length of the cylindrical portion of said sealing element such that the latter is adapted to have sliding motion within said combined cavities.

3. A vent mechanism comprising, a body having a shallow cylindrical cavity sealed at one end and a conical cavity of approximately equal base and altitude in continuation of the open end of said cylindrical cavity, said conical cavity having a vent hole at its apex and longitudinally disposed grooves communicating therewith, the sealed end of said cylindrical cavity being further provided with a centrally disposed vent hole, and a sealing element having a cylindrical portion and a truncated conical portion with surface elements in respective parallelism with the surface elements of said combined cavities, the over-all length of said cylindrical cavity being greater than the over-all length of the cylindrical portion of said sealing element such that the latter is adapted to have sliding motion within said combined cavities.

EARL R. GIESEMAN.